United States Patent
Banzhaf et al.

(10) Patent No.: US 6,837,194 B2
(45) Date of Patent: Jan. 4, 2005

(54) MOTOR VEHICLE COOLING SYSTEM AND MOTOR VEHICLE EMBODYING SAME

(75) Inventors: Matthias Banzhaf, Heilbronn (DE); Wolfgang Kramer, Waiblingen-Endersbach (DE); Reinhard Kull, Ludwigsburg (DE); Eberhard Pantow, Moeglingen (DE); Wolfgang Reeb, Aichtal (DE); Annegret Tillmann, Esslingen (DE)

(73) Assignee: BEHR GmbH & Co., Stuttgart (DE)

( * ) Notice: Subject to any disclaimer, the term of this patent is extended or adjusted under 35 U.S.C. 154(b) by 50 days.

(21) Appl. No.: 10/222,965

(22) Filed: Aug. 19, 2002

(65) Prior Publication Data

US 2003/0047151 A1 Mar. 13, 2003

(30) Foreign Application Priority Data

Aug. 17, 2001 (DE) .......................... 101 41 156
May 25, 2002 (DE) .......................... 102 23 386

(51) Int. Cl.$^7$ ................................ F01P 7/10
(52) U.S. Cl. ................ 123/41.49; 123/41.33; 180/68.1; 180/68.4
(58) Field of Search .......................... 123/41.49, 41.33; 180/68.1, 68.4

(56) References Cited

U.S. PATENT DOCUMENTS

| 2,253,438 | A | * | 8/1941 | Lutz ........................ 180/68.4 |
| 2,383,640 | A | * | 9/1945 | Findley ................. 237/12.3 B |
| 3,728,856 | A | | 4/1973 | Scherenberg |
| 4,589,379 | A | * | 5/1986 | Fujikawa et al. ........ 123/41.49 |
| 4,846,258 | A | | 7/1989 | Charles |
| 6,401,801 | B1 | * | 6/2002 | Dicke ...................... 123/41.49 |
| 6,564,857 | B1 | | 5/2003 | Zobel et al. |

FOREIGN PATENT DOCUMENTS

| DE | 2 008 159 | 9/1971 |
| DE | 2 235 729 | 1/1974 |
| DE | 43 07 503 C2 | 1/1995 |
| DE | 199 27 607 A1 | 12/2000 |
| DE | 199 50 753 A1 | 4/2001 |
| GB | 1 380 874 | 1/1975 |
| GB | 2 127 487 A | 4/1984 |
| GB | 2 275 996 A | 9/1994 |
| JP | 8-61062 A | 3/1996 |

* cited by examiner

*Primary Examiner*—Noah P. Kamen
(74) *Attorney, Agent, or Firm*—Foley & Lardner LLP

(57) ABSTRACT

The motor vehicle cooling system (10) contains a fan (12) with which at least one cooler (13) is associated. Provision is made for the fan (12) to be in the form of a centrifugal blower with an air guiding housing (18).

19 Claims, 5 Drawing Sheets

MOTOR VEHICLE COOLING SYSTEM AND MOTOR VEHICLE EMBODYING SAME

CROSS-REFERENCE TO RELATED PATENT APPLICATIONS

The right of priority under 35 U.S.C. §119(a) is claimed based on German Patent Applications No. 101 41 156.1, filed Aug. 17, 2001, and No. 102 23 386.1, filed May 25, 2002, the entire disclosure of which is hereby incorporated by reference.

BACKGROUND OF THE INVENTION

The invention relates to a motor vehicle cooling system, with a fan that is associated with a cooler. The invention furthermore relates to a motor vehicle embodying such a cooling system.

Motor vehicle cooling systems of the general type mentioned above are already known. They contain an axial fan which is provided in order to achieve a desired cooling air throughput. Charging air fed by a turbocharger is cooled in the charging air cooler and then fed into an internal combustion engine, for example, a turbocharged diesel engine. In the coolant radiator, coolant coming from the internal combustion engine is cooled and then returned to the internal combustion engine, preferably with the formation of a closed coolant circuit. Both the charging air cooling and the coolant cooling is performed by cooling air passing through the corresponding coolant units, the axial fan being interposed downstream, in the coolant air flow direction, the units arranged in series and ahead of the internal combustion engine. By means of the axial fan the cooling air is aspirated such that it passes, as a rule, first through the charging air cooler, then through the coolant radiator, and lastly it flows out on the discharge side of the axial fan at least partially toward the engine housing (engine block of the internal combustion engine). The cooling units (charging air cooler, coolant radiator) are thus arranged one after the other in the direction of flow of the cooling air, and as a rule they are configured as cross-flow coolers. Furthermore, these cooling units are arranged at the front of the engine housing of the corresponding motor vehicle—with the axial fan interposed—and thus, as a rule, also at the front end of the vehicle.

Since the power demanded of internal combustion engines, both in passenger cars and trucks, is constantly increasing, a correspondingly more powerful cooling system must be provided in the motor vehicle. At the same time it must be considered that the space required for a cooling system of greater power cannot be expanded indefinitely, but is subject to the structural space limitations of the particular internal combustion engine design. The known motor vehicle cooling systems are disadvantageous since they have unsatisfactory efficiency and/or cannot be installed in the existing or designed motor vehicle's available space while at the same time providing the required cooling performance.

SUMMARY OF THE INVENTION

One object of the invention is to provide a motor vehicle cooling system of the general type referred to above, which is distinguished by improved efficiency in comparison to conventional cooling systems and at the same time is flexibly adaptable to structural installation requirements specific to motor vehicles.

In accordance with one aspect of the present invention, there has been provided a cooling system for a motor vehicle having an internal combustion engine, comprising a fan and at least one cooler associated with the fan, wherein the fan comprises a centrifugal blower with an air guiding housing.

In accordance with another aspect of the invention, there is provided a motor vehicle with a cooling system, wherein the cooling system comprises a cooling system as defined above.

Further objects, features and advantages of the present invention will become apparent from the detailed description of preferred embodiments that follows, when considered together with the accompanying figures of drawing.

DETAILED DESCRIPTION OF THE PREFERRED EMBODIMENTS

Figure 1:
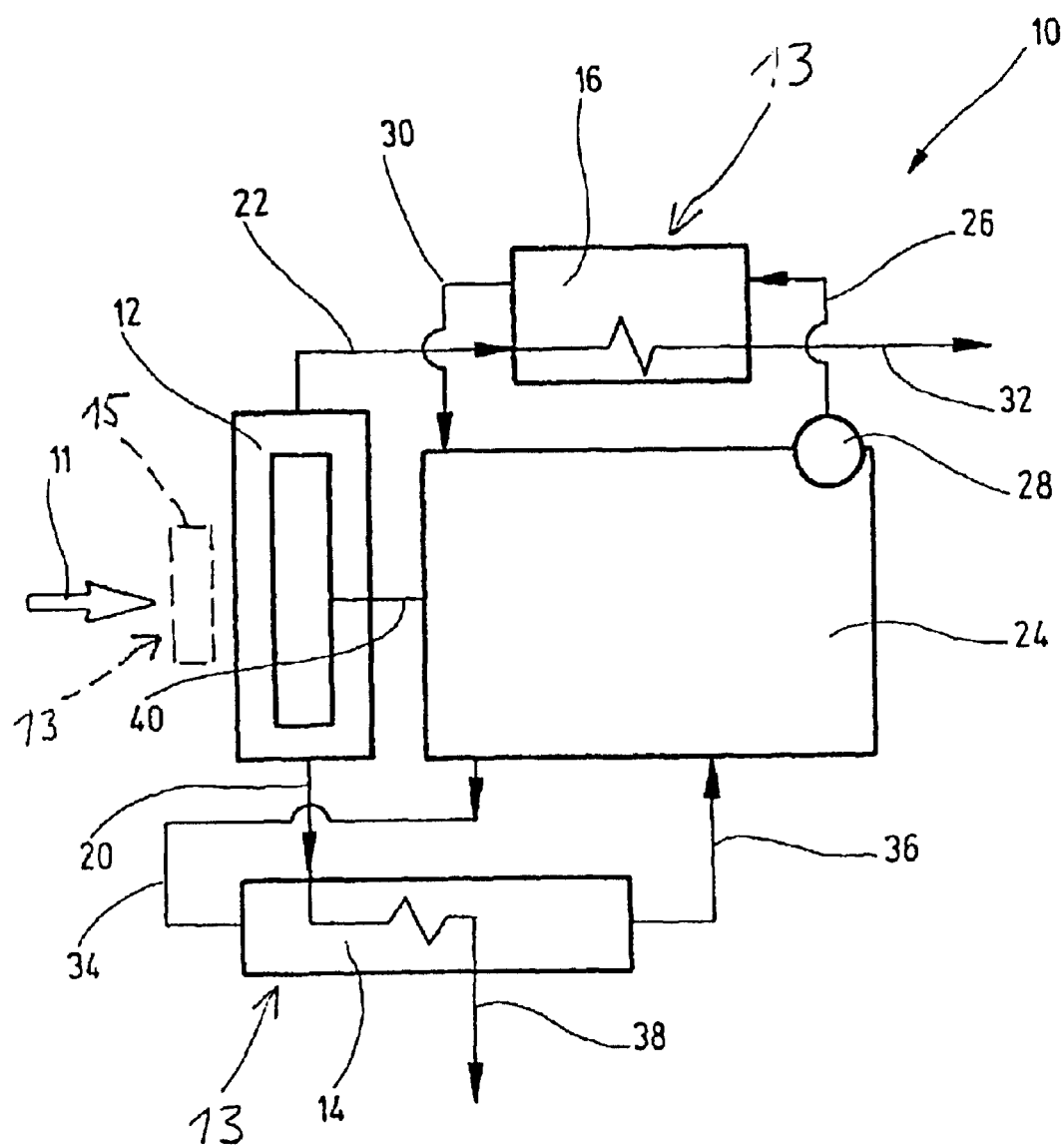
FIG. 1 shows a motor vehicle cooling system of the invention, with the aid of a block circuit diagram.

A motor vehicle cooling system according to the invention is distinguished by the fact that the fan is configured as a centrifugal blower with an air guiding housing. Centrifugal blowers are characterized by comparatively good static efficiency of 70% to 75%, while the efficiency of good axial fans is only 45% to 50%. While axial fans are usually operated at a comparatively low working pressure and a high volume of flow, centrifugal blowers operate at relatively high working pressures and low volumes of flow. Furthermore, a centrifugal blower, due to radial air deflection (beneficial to flow) of the same cooling air that is passing through it, permits a spatial arrangement of the units of the cooling system that is adapted design-wise to the particular configuration of the internal combustion engine and of the motor vehicle. In contrast to this, in the case of an axial fan, an arrangement of all cooling units (e.g., coolant radiator, charging air cooler) is provided substantially along one axis (the direction of aspiration of the axial fan).

Advantageously, the air guiding housing is a spiral one. A centrifugal blower with a spiral housing is characterized by an especially good efficiency and at the same time permits the attainment of the advantages mentioned above.

Advantageously, at least one cooler is a radiator for the coolant of an internal combustion engine. According to a preferred embodiment, however, at least one cooler can be, additionally or alternatively, a charging air cooler, an oil cooler, a condenser of an air conditioner and/or another cooling unit (for example an exhaust gas recycling cooler). The charging air cooler can be in the form, for example, of a combination charging air/air cooler or a combination charging air/coolant radiator. Also, the coolant radiator can be a high-temperature or a low-temperature radiator. In the case of a plurality of units (coolers) which are to be cooled and are arranged at the discharge end of the radial compressor, the centrifugal blower can have a single cooling air outlet to which is connected a cooling air guidance system constructed appropriately for different air flows and connected to the units, or the centrifugal blower can have several cooling air outlets, each communicating with a particular corresponding unit. Any cooling air division that may be necessary can be achieved in a manner known in itself, by using suitable devices such as valves, dampers, slides, baffles or the like.

The charging air cooler is preferably in the form of a counterflow cooler. A charging air cooler configured as a counterflow cooler is characterized by better utilization of cooling air in comparison to a crossflow cooler. At the same time the amount of cooling air required is relatively small on account of the good utilization of cooling air in the counterflow principle.

Advantageously, at least two coolers are connected in series with the interposition of the centrifugal blower. Alternatively or additionally, at least two coolers can be connected parallel to one another. The use of a centrifugal blower permits an advantageous number of possibilities for the arrangement of different kinds of coolers, if desired. At least one cooler, especially a coolant radiator, can be arranged at the discharge end of the centrifugal blower. Also, it is additionally or alternatively possible to arrange at least one cooler alongside or above or underneath an internal combustion engine of a motor vehicle. In the case of a plurality of coolers, they can be arranged on only one side or, if desired, also on several different sides (lateral, top and/or bottom side) of the internal combustion engine.

Preferably the centrifugal blower is designed as one that can be placed in front of an internal combustion engine of a motor vehicle. This permits a comparatively flexible and structurally relatively simple arrangement of the other units of the cooling system in a motor compartment. Alternatively, the centrifugal blower can be arranged if necessary also in a comparatively simple manner in any other suitable position with respect to the internal combustion engine (for example, above, below or on the side of the internal combustion engine).

Advantageously the coolant radiator and the charging air cooler are connected parallel to one another on the discharge side of the centrifugal blower. Since the cooling units can be placed on the discharge side of the centrifugal blower, and not in front of the fan as in the conventional cooling system, a comparatively cold air stream can be drawn in by means of the centrifugal blower. As a result, in the case of an assumed constant flow volume of the cooling air passing through the centrifugal blower, a relatively great mass flow thereof can be passed to the cooling units, so that on account of the greater cooling air delivery (with respect to the fan speed and fan wheel diameter) greater cooling power can be produced in the motor vehicle. Furthermore, the delivery pressure of the centrifugal blower increases with greater air density (cold air). Thus, even the volume of flow increases. However, in the case of an arrangement of the cooling units at the intake side of an axial fan (conventional cooling system), air warmed by the cooling units is drawn in by means of the axial fan, so that, at an assumed constant volume of flow, relatively low mass flows of cooling air pass through the axial fan, and accordingly low cooling performance can be achieved by means of the cooling units. Furthermore, a centrifugal blower is especially suitable for the aerodynamic division of the very same cooling air stream passing through it into two streams of cooling air for the separate cooling of the cooling units (coolant radiator, charging air cooler) arranged parallel to one another on the discharge side of the centrifugal blower. On account of the parallel arrangement of the two cooling units, both of them are swept with comparatively cold or unpreheated air, independently of one another.

Preferably the centrifugal blower is one that can be used in front of an internal combustion engine, and the coolant radiator and the charging air cooler can be on either side of the internal combustion engine. In this case, the centrifugal blower is connected by a discharge duct to the coolant radiator and to the charging air cooler. At the same time, the discharge ducts are preferably aerodynamic cold air ducts. In this manner a flexible adaptation of the cooling unit system is possible in the available space within the motor vehicle, while at the same time a relatively low fan driving power is needed. Furthermore, with such an arrangement of the cooling units, a relatively small front area is occupied in the engine compartment of the vehicle, so that more room is available in the engine compartment for a more powerful internal combustion engine while at the same time assuring an effective cooling system. A similar effect can be achieved by a lateral arrangement of the cooling units, but in front of the engine, so that in this manner a comparatively great amount of front space in the engine compartment can be used for the internal combustion engine, while the cooling units occupy only a lateral space with respect to the internal combustion engine in the front area of the engine compartment. At the same time the cooling air streams issuing radially from the centrifugal blower can be guided by aerodynamic means to the cooling units. Other advantageous possibilities for arranging the cooling units are conceivable: for example, above and/or below the motor block.

The coolant radiator can be designed as a counterflow radiator or as a cross-current radiator. On account of the flexible arrangement of the cooling air guidance, an aerodynamic and therefore efficient connection of the centrifugal blower to variously designed cooling units can be achieved. Also, the charging air cooler can be designed as a multiple-path cooler.

The centrifugal blower is advantageously driven by the internal combustion engine. When a conventional cooling system with axial fans is used, as much as 10% of the power produced by a turbocharged diesel engine of a truck is used for driving the cooling system. But substantially less power is taken from the internal combustion engine in order to drive a more efficient cooling system with centrifugal blowers, which is in harmony with the trend towards using more powerful internal combustion engines in motor vehicles. In comparison to axial fans, centrifugal blowers offer lower impeller driving power due to their greater blowing efficiency. To achieve a specific cooling power in the cooling system of the invention, a smaller volume of air needs to be delivered by the fan, resulting in greater available power in the internal combustion engine and lower fuel consumption by the motor vehicle. The centrifugal blower can be driven, for example, by means of the crankshaft in the internal combustion engine, with the interposition, if necessary, of a gear drive or belt drive (step-up drive). Alternatively in this regard, even a separate electric motor can be provided, or a hydrostatic drive.

Advantageously, the charging air cooler is connected at its air inlet side with a turbocharger through a charging air duct, and at its charging air discharge side it is connected by a charging air duct to the internal combustion engine. Such a charging air supply system, known in itself, can then be provided advantageously with relatively short charging air ducts. The reason for this is that the charging air ducts do not lead to a charging air cooler arranged as in conventional cooling system in front of the internal combustion engine, but the charging air cooler can now be arranged in the engine compartment at a place that is structurally better (better for overall efficiency) due to the use of a centrifugal blower, combined with a more advantageous configuration of comparatively short charging air ducts (less pressure loss), and with a corresponding reduction of the power needed to supply charging air. Also, an improved engine responsiveness can thus be achieved.

Preferably the cooling medium of the charging air cooler and coolant refrigerator is air, which can be fed through a duct to the coolant radiator and to the charging air cooler. The cooling air ducts are made especially aerodynamic, so that the power losses in feeding cooling air from the centrifugal blower to the cooling units will be as low as possible.

Advantageously, cooling ducts are provided on the discharge side of the coolant radiator to remove cooling air. Thus the cooling air issuing from the cooling system is not carried against the motor block of the internal combustion engine, as it is when axial fans are used in conventional motor vehicle cooling systems, but in the movement of the cooling air they are carried in areas of low resistance to flow in the engine compartment, avoiding the power losses so undesirable in the movement of the cooling air.

The internal combustion engine can be a supercharged Otto cycle motor or a diesel motor, especially a turbo diesel motor, in a truck or passenger car.

Turning now to the drawings, FIG. 1 shows a block circuit diagram of a motor vehicle cooling system 10 according to the invention. The cooling system or arrangement 10 contains a blower 12, which is configured as a centrifugal blower and is in a driven relationship with an internal combustion engine 24 through a shaft 40, that is, the centrifugal blower 12 is driven by the internal combustion engine 24. The centrifugal blower draws in cooling air axially in the direction indicated by arrow 11 and divides it into two radially issuing cooling air streams, a first stream being fed through a cooling air duct (arrow 20) to a first cooler 13, which in the present embodiment is a coolant radiator 14, and the second cooling air stream passes through an additional cooling air duct (arrow 22) into a second cooler 13, which in the present example is a charging air cooler 16. The coolant radiator 14 is part of a closed coolant circuit wherein coolant is driven by the internal combustion engine 24 through a coolant duct (arrow 34) into the coolant radiator 14, which is simultaneously blasted with cooling air by means of the centrifugal blower 12 indicated by arrow 20. The cooling air passes through the coolant radiator 14 and is carried out of it by a cooling air duct (arrow 38). The coolant, cooled in this manner, is carried back through a coolant duct into the internal combustion engine 24, as indicated by arrow 36. The charging air cooler 16 is blasted with charging air through a charging air duct (arrow 26) by means of a turbocharger 28. The charging air is cooled in the charging air cooler 16 by cooling air fed by the centrifugal blower 12 through the cooling duct according to arrow 22, and then passes through a charging air duct (arrow 30) into the internal combustion engine 24. The cooling air passing through the cooling air cooler 16 is preferably carried away through cooling air duct according to arrow 32. The charging air cooler 16 is configured as a counterflow cooler, in the form of a multiple-path cooler, if desired. The coolant radiator 14 can be configured as a counterflow cooler, as a cross-current cooler, or as a multiple-path cooler. The coolant radiator 14 and the charging air cooler 16 are arranged parallel to one another on the exit side of the centrifugal blower 12. At the same time, the centrifugal blower 12 is arranged in front of the internal combustion engine 24 (motor block) and the coolant radiator 14 and charging air cooler 16, one on each side of the internal combustion engine 24. If desired, an additional cooler 13 can be arranged in the axial direction with reference to the blower 12, and in front of it (cooler 15 in broken lines). The internal combustion engine 24 is preferably a diesel engine, especially a turbocharged diesel engine of a truck or a passenger car.

Figure 2:
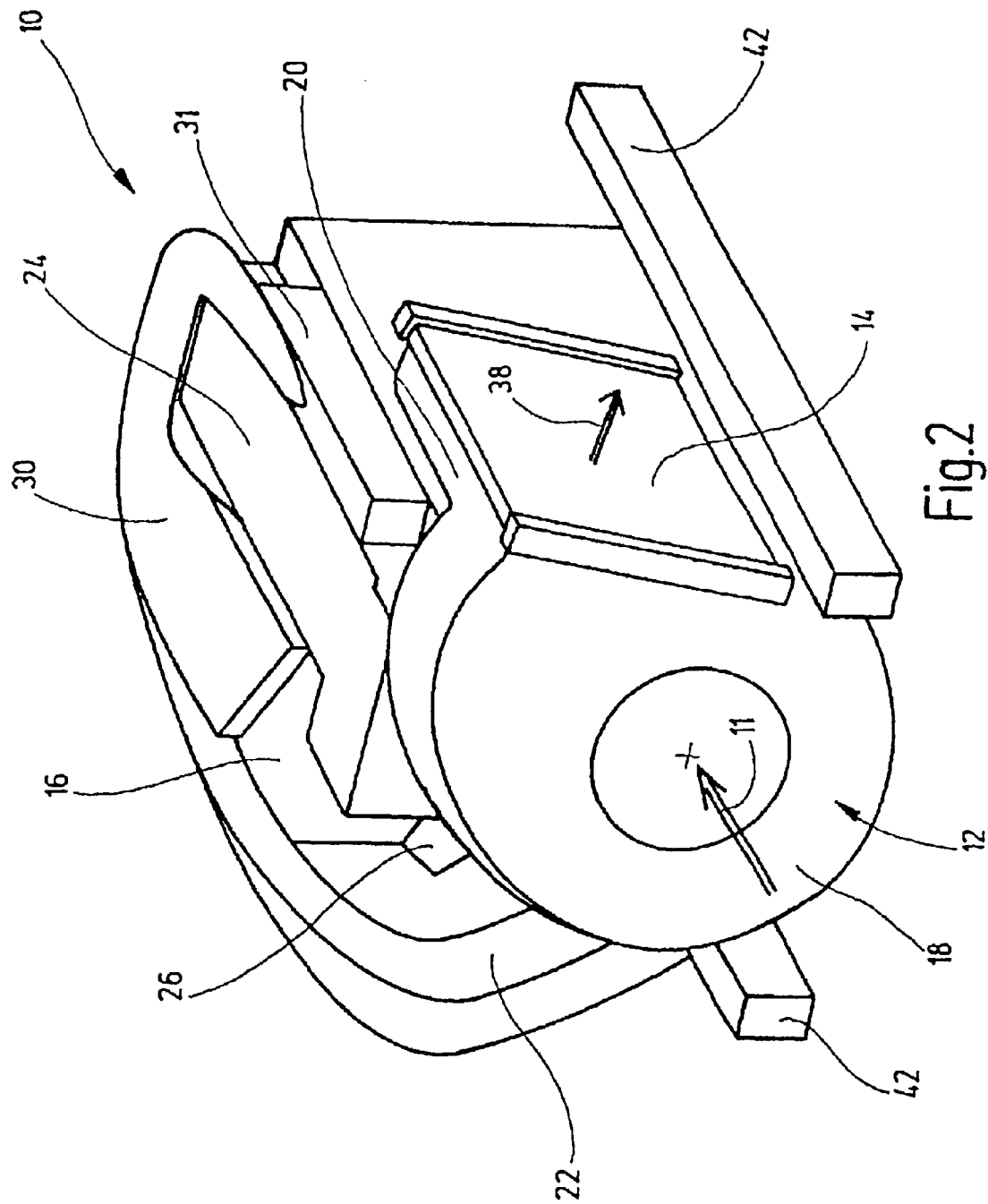
FIG. 2 is a schematic perspective drawing of a motor vehicle cooling system of FIG. 1.
Figure 3:
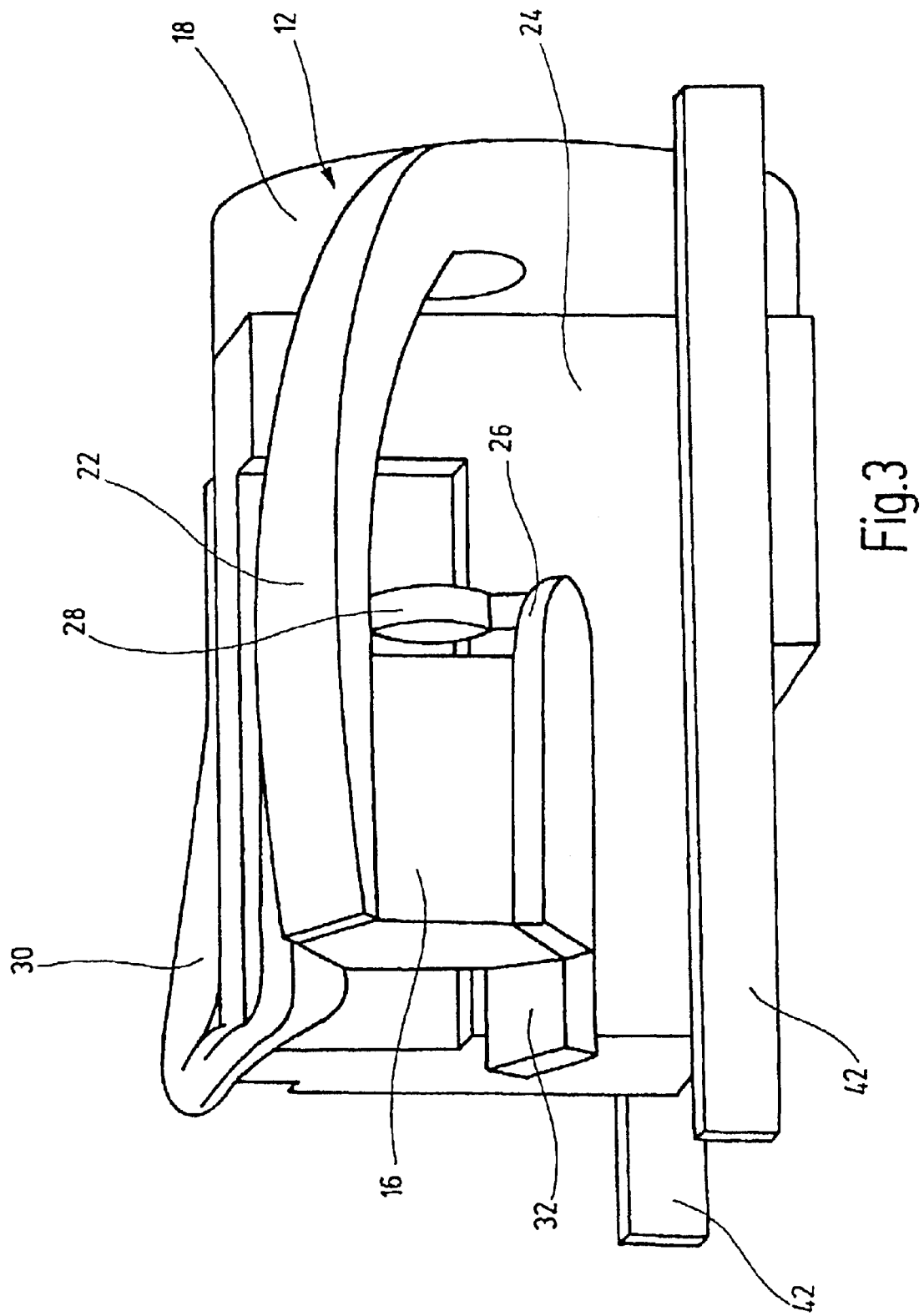
FIG. 3 is a schematic perspective side view of the motor vehicle cooling system of FIG. 2.
Figure 4:
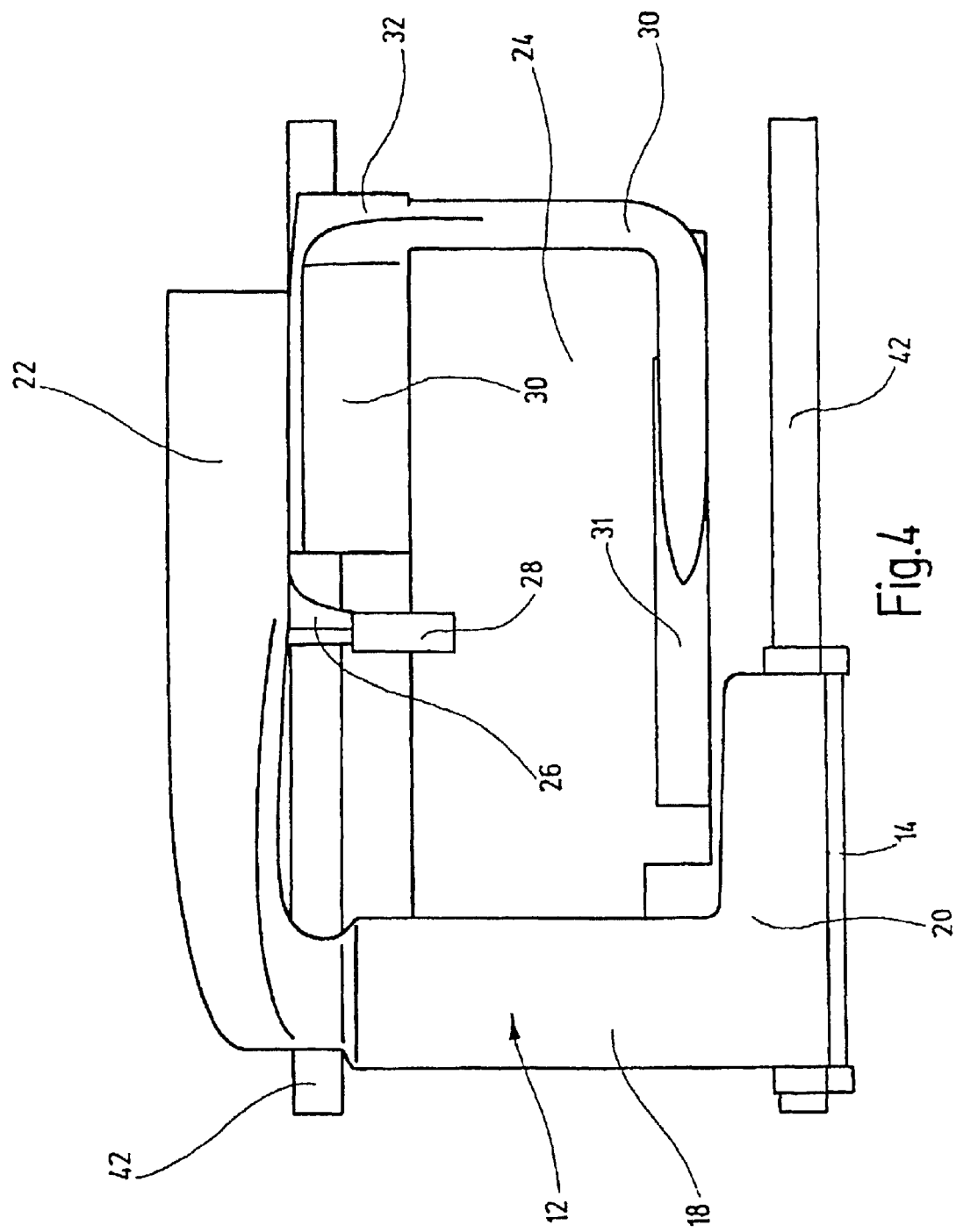
FIG. 4 is a schematic top plan view of the motor vehicle cooling system of FIG. 2.

FIGS. 2 to 4 show schematic views of a motor vehicle cooling system 10 corresponding to the block diagram of FIG. 1. The centrifugal blower 12 is provided with an air duct housing 18 which in this embodiment is a spiral housing. The coolant radiator connected with the centrifugal blower 12 is configured as a cross-current cooler out of which cooling air issues freely according to arrow 38 into the lateral space (free space) beside the engine of the motor vehicle. The charging air duct 30 connects the charging air cooler 16 to an air manifold 31 of the internal combustion engine 24 so as to feed the cooled charging air to the latter. The cooling air ducts 20 and 22 and the charging air ducts 26 and 30 are made to be especially aerodynamic (relatively low resistance to flow). The internal combustion engine 24 (motor block) is held stably in position by means of motor supports 42, known in themselves. The rest of the construction and manner of operation of the motor vehicle cooling system 10 of FIGS. 2 to 4 are the same as those of FIG. 1. The cooling air duct 32 (cooling air exhaust from the charging air cooler 16) is represented by way of suggestion.

Figure 5:
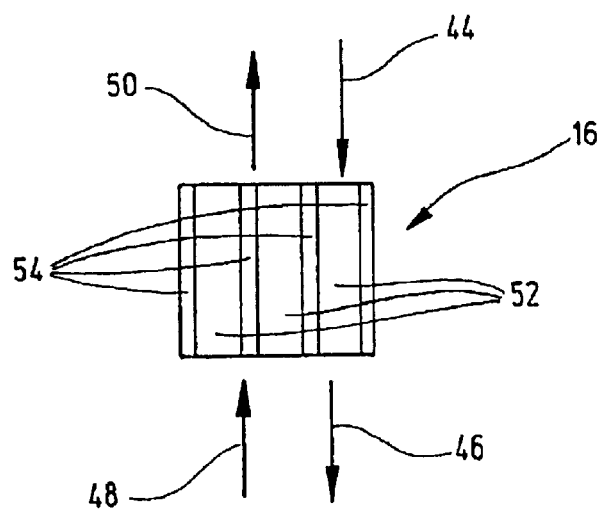
FIG. 5 is a schematic side view of a charging air cooler of a motor vehicle cooling system of the invention, configured as a counterflow cooler.
Figure 6:
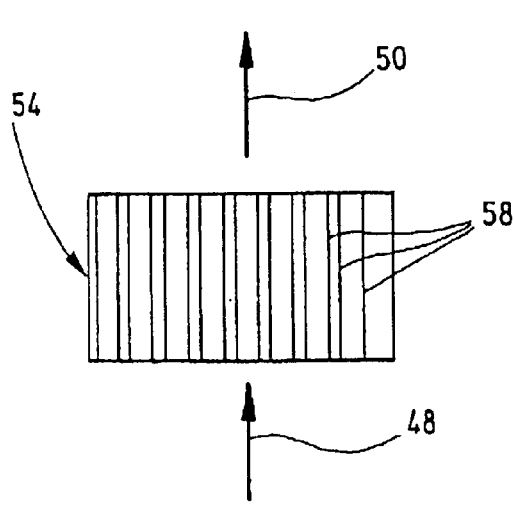
FIG. 6 is a cross section taken through the charging air cooler of FIG. 5 in a plane through which charging air passes.
Figure 7:
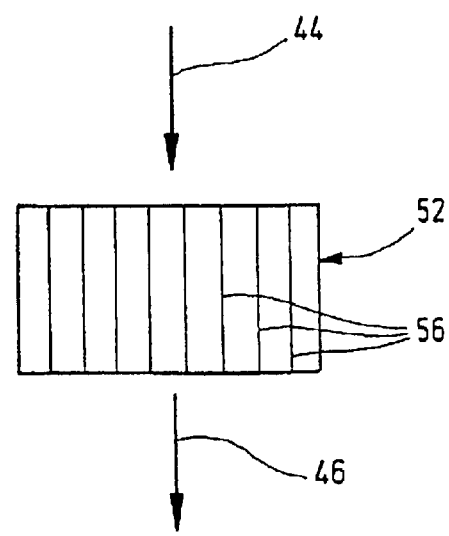
FIG. 7 is a cross section through the charging air cooler of FIG. 5 in a plane through which cooling air passes.

FIG. 5 shows a schematic representation of a charging air cooler (16) as a counter-flow cooler. The cooling air, at about 25° C. for example, is delivered according to arrow 44 to the charging air cooler 16 (plane 52 through which cooling air passes) wherein the same passing charging air (arrows 48, 50; charging air plane of passage 54) is cooled such that the cooling air leaves the charging air cooler 16 according to arrow 46 at a temperature of about 200° C., for example. The charging air entering according to arrow 48 into the charging air cooler 16 usually has a working temperature of up to 260° C., and is cooled by the cooling air (arrows 44, 46) to a working temperature of about 40° C., at which the charging air is fed to the air manifold 31 and thus to the internal combustion engine 24. The charging air cooler 16 in the form of a counter-flow cooler is especially advantageous, since—in contrast to plain cross-current coolers—the cooling air can be heated up to close to the entrance temperature of the charging air, so that a fundamentally desired good utilization of the heat absorption capacity of the cooling air is assured. The charging air cooler 16 of FIG. 5 can also be designed as a multiple-path cooler. In FIG. 6 there is shown a charging air stream passing through the charging air cooler 16 as in FIG. 5, in a charging air plane 54 according to arrows 48 and 50, while FIG. 7 shows a cooling air plane 52 of the charging air cooler 16 in which, according to the arrows 44 and 46, a stream of cooling air passes through the charging air cooler 16. In FIGS. 6 and 7, furthermore, ribbing 58 and 56 are represented in their respective planes of passage 54 and 52.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A cooling system for a motor vehicle having an internal combustion engine, comprising a fan and a first heat exchanger and a second heat exchanger, wherein the fan comprises a centrifugal blower with an air guiding housing, wherein the air guiding housing comprises spiral housing, wherein the centrifugal blower is placed frontally before the internal combustion engine and is drivable by the internal combustion engine and wherein the centrifugal blower is connected by a first exhaust duct to the first heat exchanger and by a second exhaust duct to the second heat exchanger, said first heat exchanger, said second heat exchanger being connected in parallel with the centrifugal blower.

2. A cooling system according to claim 1, wherein the first heat exchanger comprises a coolant radiator for the internal combustion engine coolant.

3. A cooling system according to claim 2, wherein the first heat exchanger is disposed at the discharge side of the centrifugal blower.

4. A cooling system according to claim 2, wherein the coolant radiator comprises a counterflow cooler, a crossflow cooler or a multiple-path cooler.

5. A cooling system according to claim 1, wherein the second heat exchanger comprises a charging air cooler.

6. A cooling system according to claim 5, wherein the charging air cooler comprises a counterflow cooler.

7. A cooling system according to claim 5, wherein the charging air cooler comprises a multiple-path cooler.

8. A cooling system according to claim 5, wherein the charging air cooler is connected at its charging air inlet side by means of a charging air duct to a charging air turbocharger and at its charging air discharge side to the internal combustion engine by means of a charging air duct.

9. A cooling system according to claim 1, wherein the first heat exchanger comprises an oil cooler.

10. A cooling system according to claim 1, wherein the second heat exchanger comprises a condenser of an air conditioning system.

11. A cooling system according to claim 1, wherein the first heat exchanger is placed laterally or above or below the internal combustion engine.

12. A cooling system according to claim 1, wherein the first heat exchanger comprises a coolant radiator and the second heat exchanger comprises a charging air cooler connected parallel to one another on the discharge side of the centrifugal blower.

13. A cooling system according to claim 12, wherein the coolant for cooling charging air in the charging air cooler and used for cooling the internal combustion engine coolant provided by the coolant radiator comprises cooling air.

14. A cooling system according to claim 13, further comprising cooling air ducts for exhausting cooling air provided on the cooling air exhaust side of the coolant radiator and/or on the cooling air cooler.

15. A cooling system according to claim 1, wherein the first heat exchanger comprises a coolant radiator, and the coolant radiator and a charging air cooler are placed each on one side of the internal combustion engine, and the centrifugal blower is connected by the first exhaust duct to the coolant radiator and by the second exhaust duct to the charging air cooler, respectively.

16. A cooling system according to claim 1, wherein the centrifugal blower comprises a driving connection with the internal combustion engine.

17. A cooling system according to claim 1, wherein the internal combustion engine comprises a turbocharged diesel engine for a truck or a passenger car.

18. A motor vehicle with a cooling system, wherein the cooling system comprises a cooling system as defined by claim 1.

19. A cooling system for a motor vehicle having an internal combustion engine, comprising a fan and at least one cooler associated with the fan, wherein the fan comprises a centrifugal blower with an air guiding housing, wherein the air guiding housing comprises a spiral housing, wherein the centrifugal blower is placed frontally before the internal combustion engine and is drivable by the internal combustion engine, wherein the centrifugal blower is connected by an exhaust duct to the at least one cooler and wherein the cooling system comprises at least two coolers connected in series with one another with the interposition of the centrifugal blower.

* * * * *